United States Patent [19]

Ross

[11] E Patent Number: Re. 32,025

[45] Reissued Date of Patent: Nov. 12, 1985

[54] COCKTAIL FILLING MACHINE AND METHOD

[75] Inventor: Edward E. Ross, San Rafael, Calif.

[73] Assignee: Del Monte Corporation, San Francisco, Calif.

[21] Appl. No.: 556,796

[22] Filed: Dec. 1, 1983

Related U.S. Patent Documents

Reissue of:

[64] Patent No.: 4,304,085
Issued: Dec. 8, 1981
Appl. No.: 93,584
Filed: Nov. 13, 1979

[51] Int. Cl.[4] ..... B65B 1/36

[52] U.S. Cl. ..... 53/435; 53/474; 53/515; 53/534; 53/238; 53/239; 83/409.2; 141/103; 141/131

[58] Field of Search ..... 53/435, 474, 515, 155, 53/237, 238, 239, 240, 534; 141/9, 103, 131, 170, 177; 222/307, 308; 198/440, 442; 83/409.1, 409.2

[56] References Cited

U.S. PATENT DOCUMENTS

| | | | |
|---|---|---|---|
| 312,689 | 2/1885 | Williams | 222/307 |
| 420,910 | 2/1890 | Little | 222/307 X |
| 1,835,676 | 12/1931 | Scholz | 141/131 X |
| 2,076,942 | 4/1937 | Gardner | 53/515 |
| 2,280,776 | 4/1942 | Allen | 141/9 |
| 2,884,973 | 5/1959 | Crow | 83/409.1 |
| 2,910,212 | 10/1959 | Kerr | 222/307 X |
| 3,552,537 | 1/1971 | Vanvakas | 198/442 |
| 3,994,321 | 11/1976 | Eisenberg | 141/131 X |
| 4,061,164 | 12/1977 | Sato | 141/177 X |
| 4,103,720 | 8/1978 | Eisenberg | 141/131 X |
| 4,221,104 | 9/1980 | Ross | 53/435 |

*Primary Examiner*—John Sipos
*Attorney, Agent, or Firm*—Flehr, Hohbach, Test, Albritton & Herbert

[57] ABSTRACT

A machine and method which serves to introduce measured amounts of different items (e.g., pieces of different fruits) into containers such as cans or jars. Features of the machine and method include high filing speed, straight-line movement of means carrying separate measured amounts of the items, volumetric measuring pockets that are adjustable, and simplicity of construction and operation. Preferably the machine also incorporates means for orienting, slicing, and depositing a predetermined number of cherry halves into the containers.

18 Claims, 19 Drawing Figures

COCKTAIL FILLING MACHINE AND METHOD

Matter enclosed in heavy brackets [ ] appears in the original patent but forms no part of this reissue specification; matter printed in italics indicates the additions made by reissue.

This invention relates generally to machines and methods for introducing measured amounts of different items (e.g., pieces of different fruits) into containers such as cans or jars, and is intended for use in food processing and canning plants.

Machines are presently available which are employed in canneries for producing canned fruit cocktail. Such products contain pieces of several kinds of fruit, such as peaches, pineapple, grapes, pears, citrus, cherries and the like. The machines commonly used in filling the cans or jars with measured amounts of the different fruits employ several rotary units, one for each fruit, each of which has a cylindrical hopper that supplies the fruit to underlying measuring pockets. The cans or other containers are moved in single file along a straight or serpentine path whereby they are successively brought into cooperative relationship with the measuring pockets of the several rotary units. While a container is in registry with the measuring pocket of a rotary unit, the pocket delivers the measured amount of fruit into the container. The measuring pockets consist of telescopically fitted cylindrical parts whereby the volume can be adjusted to axial movement of the parts toward or away from each other.

Machines as described above have a number of disadvantages. The construction and operation of the various parts are relatively complicated, with the result that such machines are expensive to construct and maintain. The inherent construction of such machines also complicates clean-up operations such as are necessary to maintain proper plant sanitation. When such machines are operated at speeds higher than about 250 cans per minute spillage of significant amounts of product occurs because of centrifugal force during transfer of the product to the cans. Higher filling speeds without product spillage is desirable for greater productivity and efficiency. Occasionally an underlying container is not positioned to receive product dropped from a measuring device and in such event the product is deposited on the floor and cannot be used. The complicated nature of the machine does not permit the use of recovery pans to catch such products. When it is desired to include cherry halves in the mix, it is customary to slice them by a separate machine and introduce them into the cans by special feeding device.

It is an object of the present invention to provide a cocktail filling machine which is relatively simple in construction and operation.

Another object is to provide a machine that is capable of operating speeds higher than that made possible with present machines without spilling such as is caused by centrifugal force in prior machines.

Another object is to provide a cocktail filling machine which avoids use of rotary units such as are used in present machines, and which is characterized by straight-lined movement of means carrying measured amounts of the different fruit items, thus avoiding centrifugal forces and product spillage.

Another object is to effect recycling of dropped product in instances where a receptacle is not below a measuring device to receive the same.

Another object is to provide such a machine with means for orienting, slicing and introducing predetermined numbers of cherry halves into the containers.

In general, the machine incorporates conveyer means having a plurality of parallel flights extending laterally at right angles to the direction of conveyer movement. The flights move through a fruit receiving zone and then through a zone in which underlying containers are filled with several fruits. Each flight has a plurality of spaced pockets disposed along the length of the same, each of which serves to receive a measured amount of fruit in the fruit receiving zone. In the container filling zone, means is provided for introducing a particular fruit into each pocket. Means is provided underlying the movement of the flights in the filling zone for moving the open containers in single file, the movement being such that each container is advanced through the filling zone below the flights along a zigzag path to successively present the same to the pockets of a flight. Means is provided for causing the delivery of fruit from a pocket when a container is disposed below the same. In its preferred form the volumetric capacity of the pockets is adjustable. In addition an end portion of each flight is adapted and cooperates with means for orienting, slicing and depositing a predetermined number of cherry halves into the containers. Also a method of supplying various items of fruit into containers making use of the above machine.

Additional objects and features of the invention will appear from the following description in which the preferred embodiments have been set forth in detail in conjunction with the accompanying drawings.

Referring to the drawings.

Figure 1:
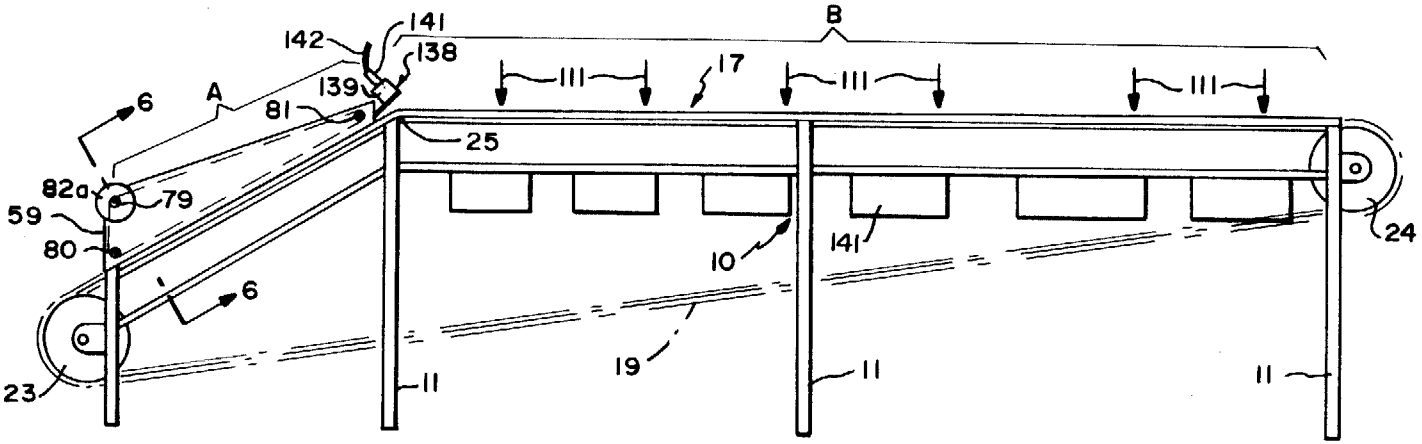
FIG. 1 is a side elevational view of a machine incorporating the present invention.

The machine illustrated in the drawing consists of a suitable frame 10 which in this instance includes the uprights 11, members 12 cross-connecting the upright members 11, the longitudinal members 13 and 14 which connect the members 12, and the longitudinal structural members 15 extending along the sides of the frame. A conveyer means 17 is supported by suitable track 19. At the extremities of the frame the chains 18 engage the sprockets 23 and 24. As shown in FIG. 1 that portion of the conveyor means which is inclined upwardly moves through what may be termed the fruit receiving zone A. The extended horizontal portion forms the container filling zone B. The track 19 is curved at 25 between these zones.

Figure 3:
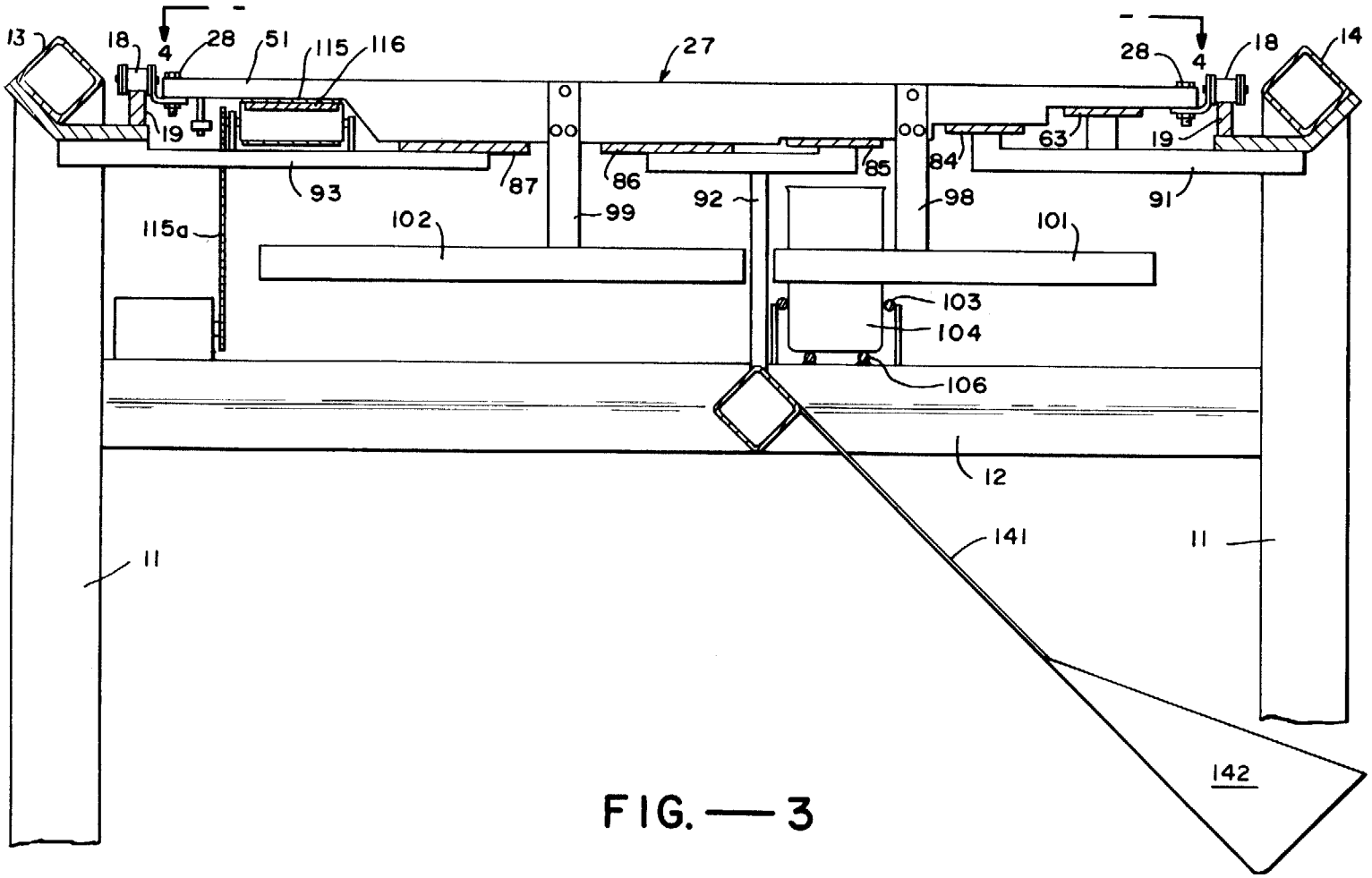
FIG. 3 is a cross-sectional view taken along the line 3—3 of FIG. 2.
Figure 4:
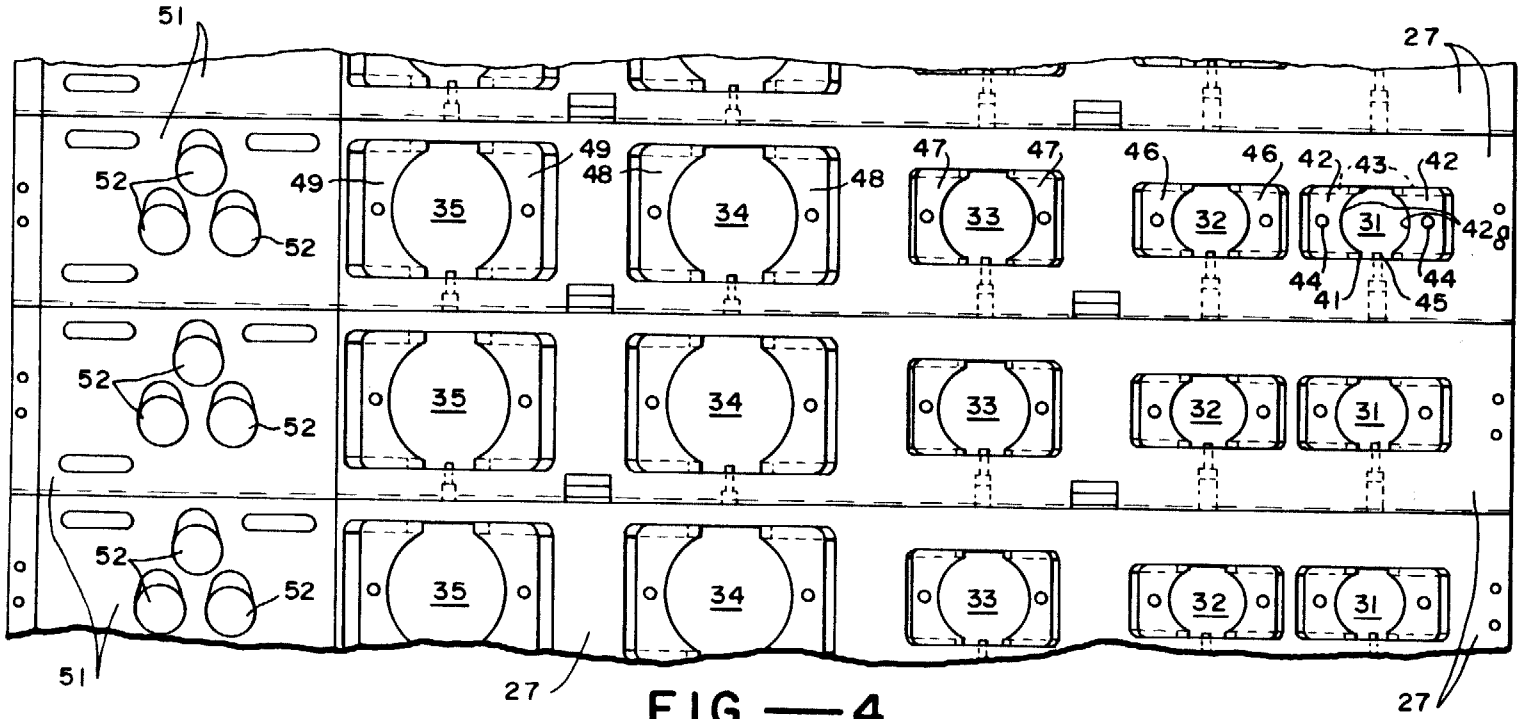
FIG. 4 is a plan view as indicated by the line 4—4 of FIG. 3 and showing the flights of the conveyer means and the adjustable pockets.
Figure 5:
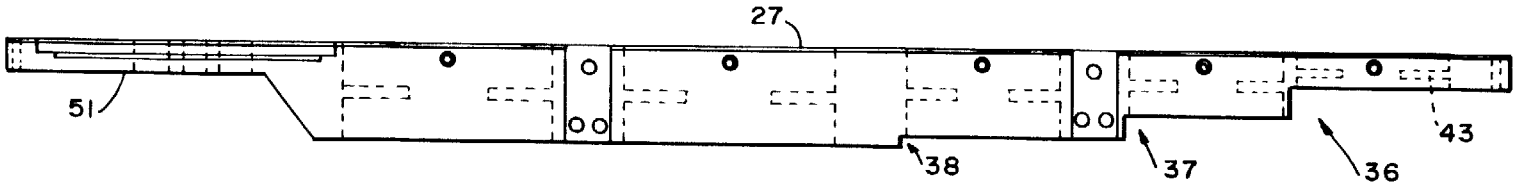
FIG. 5 is a side elevational view of one of the flights of the conveyer means.
Figure 6:
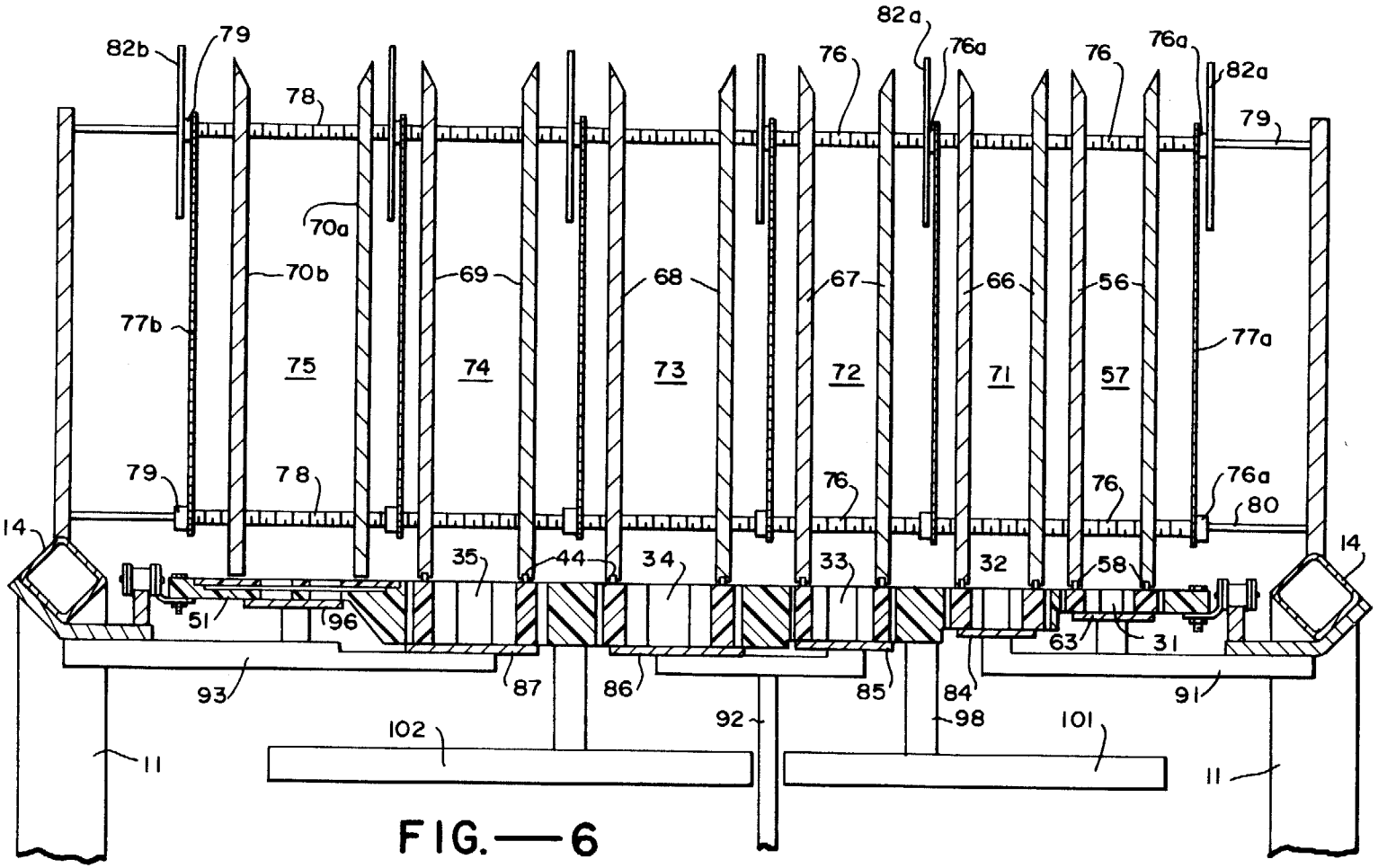
FIG. 6 is a cross-sectional view taken along the line 6—6 of FIG. 1.

As shown in FIG. 3, the conveyer means includes the flights 27 which, as indicated at 28, are secured at their ends to corresponding links of the chains 18. FIGS. 4–6 illustrate the construction of the flights. Each flight is formed to provide a plurality of measuring pockets 31, 32, 33, 34 and 35, which have different dimensions. As shown in FIG. 5, each flight is stepped as indicated at 36, 37 and 38 to provide portions of different depth for the pockets 31, 32 and 33. Preferably each of the pockets is adjustable as to volume, whereby the amount of each fruit supplied to a container can be adjusted as desired. Thus the pocket 31 is formed by an opening 41 which extends through the flight and which is rectangular as viewed in plan. Members 42 are slidably seated within opening 41 and have arcuate opposed surfaces 42a which define two opposed side surfaces of the pocket 31. The dimensions are such that when the members 42 are positioned substantially as illustrated in FIG. 4, the measuring pocket 31 is substantially cylindrical. When the blocks are moved apart, the pocket becomes oval with the major axis extending in the direction of the length of the flight. When the two blocks are moved together, the major axis is at right angles to the length of the flight. The walls of the opening 41 are provided with ribs 43 that are slidably accommodated in grooves formed in the adjacent portions of the members 42. Also each of the members 42 is provided with an upwardly extending pin 44. At a certain position in the movement of the slat, these pins 44 are engaged for the purpose of setting the members 42 to provide a predetermined volume for the pocket. To assemble or remove members 42 from opening, one and then the other is moved to a central position to disengage the same from ribs 43 and then moved axially to the opening. Removable set screws 45 prevent such removal unless set screws are first retracted into the flight wall.

The other pockets 32–35 are formed in the same manner as the pocket 31. Thus, members 46 are provided for pocket 32, members 47 for pocket 33, members 48 for pocket 34 and members 49 for pocket 35. All of these members are provided with pins 44 like the pins provided for pocket 31, and the members are similarly adjustable.

It is common practice to provide cherry halves in a fruit cocktail mix. For this purpose, the end portion 51 of each flight is provided with openings 52 dimensioned to loosely accommodate cherries of the maraschino type. As will be presently explained, the portions 51 and the openings 52 are part of means for orienting, slicing and delivering a predetermined number of cherry halves into the containers. Features of this arrangement are disclosed and claimed in my co-pending application Ser. No. 970,323 filed Dec. 18, 1978 now U.S. Pat. No. 4,221,104. However, the structure, incorporation in the present machine and the mode of operation differ in certain respects from the disclosure of that application.

The flights described above and their adjustable members for adjusting the volume of the pockets can be made of suitable material such as a relatively rigid plastic.

Figure 9:
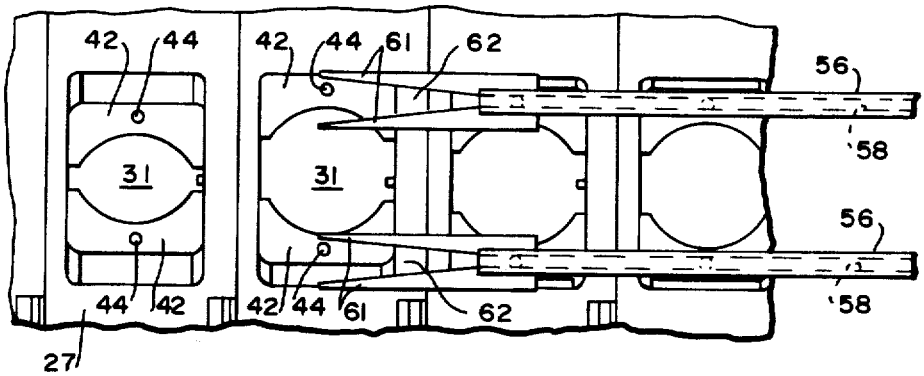
FIG. 9 is a detail showing the means employed for adjusting the volume of the pockets.

Within the zone A a plurality of hoppers overlie the conveyer and serve to supply fruit to the several pockets of the flights. As shown in FIG. 6, the members 56 form flat walls extending vertically from the conveyer means to form a hopper space 57 directly overlying the measuring pockets 31. The lower edges of the walls 56 are in close apposition with the upper surfaces of the flights and at their lower edges they are provided with grooves 58 which are dimensioned to accommodate the pins 44. As shown in FIG. 9, the upright edge portions 59 of the walls 56, adjacent the flights, carry guide members 61 that are dimensioned to form the converging paths 62 for the pins 44. Thus as a flight approaches the guide member 61, the pins 44 proceed into the convergent paths 62 which lead the pins into the grooves 58 of the associated walls 56. The positioning of the walls 56 relative to each other serves to determine the positioning of the pins 44 and of the members 42, whereby the corresponding pocket 31 is caused to have a predetermined volume. A stationary member 63 (FIG. 6) in the form of a strip underlies the pocket 31 and extends through zone A. It terminates in zone B at a region where it is desired to discharge the fruit within the pocket.

The other pockets 32, 33, 34 and 35 are similarly coordinated with walls forming feed hoppers for supplying particles of fruit to the pockets. Thus walls 66 are coordinated with the pocket 32, walls 67 with the pocket 33, walls 68 with the pocket 34, walls 69 with the pocket 35 and walls 70 and 71 which form a hopper overlying the portion 51 of each flight. These walls form hopper spaces 71, 72, 73, 74 and 75, corresponding to the hopper space 57. All of these walls, with the exception of wall 70, are connected by means which serve to permit their adjustment whereby the volume of each of the pockets 31–35 can be adjusted as desired. The means illustrated for this purpose (FIGS. 6, 10 and 11) consists of threaded tubes 76 which are journalled on the three support shafts or rods 79,80 and 81. The tubes each have right and left handed threaded engagement with the two associated walls. Thus the two walls forming a hopper space are moved together or apart as the three associated threaded tubes are rotated. The three tubes for each of the hoppers 57, 71–74 are rotated in unison as by means of sprockets 76a that are fixed to the tubes and which are engaged by chains 77a. A disc or wheel 82a is secured to one of the threaded tubes of each hopper to facilitate turning. With respect to hopper 75 and walls 70a and 70b, the wall 70a is fixed to the frame and wall 70b is engaged by threaded tubes 78, whereby only wall 70b is adjusted. Tubes 78 are connected for conjoint rotation by sprockets 79 and chains 77b and disc 82b is secured to one tube for manual operation.

The margins 59 of the hopper walls are connected by walls 83 (FIG. 2) of flexible material which serves to retain material within the hoppers while permitting adjustment of the walls.

The pockets 32, 33, 34 and 35 all have underlying members or strips 84, 85, 86 and 87 which are disposed in close proximity with the lower surfaces of the flights, and which correspond generally to the member 63 for the pocket 31. These members or strips likewise terminate at various points along the fruit filling zone B where it is desired to discharge the contents of the corresponding pocket. All of the underlying strips are suitable supported from the frame of the machine. Thus the strips 63 and 84 are supported by the member 91, the strips 85 and 86 supported by the member 92, and the strips 87 and 88 supported by the member 93.

Underlying the portions 51 of the flights, there is likewise a stationary strip 96 which extends through the zone A and through a portion of the zone B. At the position where it terminates in zone B there is an endless belt conveyor 97 which likewise extends along the zone B until it reaches a position near the discharge end of the machine. As will be presently explained, at the point of termination of the endless belt conveyor there is a further stationary underlying plate over which portions 51 pass, and which plate terminates at the point where it is desired to discharge the cherry halves.

As shown in FIG. 3, depending members 98 and 99 are secured to one side of each of the flights and serve to carry the container pusher members 101 and 102. These pusher members or bars engage and move the containers through the various filling operations.

Guiding means is provided for guiding containers being filled through a zigzag guideway underlying the flights in the zone. B. The guide means can consist of rods 103 that are carried by the machine frame and which engage opposite sides of a can 104 or other container. Similar rods 106 underlie the cans and are likewise carried by the machine frame. This guide means forms the zigzag path or guideway 107 schematically illustrated in FIG. 2. The guideway consists of portions 107a which are set at an angle to the length of the machine, and portions 107b which extend in the same direction as the length of the machine and to the travel of the flights in zone B. The first one of the portions 107a receives the cans from the conventional can feeding conveyer 108, which may be of the helicoidal type. The 1st one of the guideway portions 107a delivers the cans to the outgoing conveyor 109. Feed conveyor 108 functions to present the cans continuously, and the rate with which the cans are supplied is synchronized with movement of the flights. Thus when a pusher bar 101 arrives at a guideway portion 107a, it engages a can and from thence the can is caused to travel through the entire zigzag guideway until it is delivered to the outgoing conveyor 109. When the can reaches the first guideway portion 107b, it is directly below the first pocket 31 which has just cleared the end of the corresponding strip or deadplate 63. This permits the fruit in that pocket to fall into the can while the can is travelling through the guideway portion 107b. Suitable means such as a nozzle may overlie the pocket 31 and apply a downwardly directed blast of air upon the pocket to insure complete discharge. This is schematically illustrated in FIG. 1 by arrow 111. In connection with the operation just described, it will be noted that when a flight moves from the zone A into zone B the adjusting pins 44 are disengaged and therefore the members 42 are free to move apart a limited distance, thus ensuring that the fruit within the pocket will freely fall into the container. When the can progresses through the next guideway portion 107a it is moved laterally whereby when it enters the next portion 107b it is directly below the pocket 32 and has cleared the end of the underlying strip 84. Therefore, discharge of fruit from the pocket 32 commences and is completed by the time the can has reached the next portion 107a. The operations just described are repeated with the can being successively moved laterally of the machine and brought into alignment with successive overlying pockets, with the can continuing underneath a pocket for a sufficient time to ensure complete discharge of the fruit. The final portion 107b of the guideway brings the can beneath the portion 51 of the flights, where it receives a predetermined number of cherry halves. Thereafter the filled can is delivered to the outgoing conveyer 109.

Figure 7:
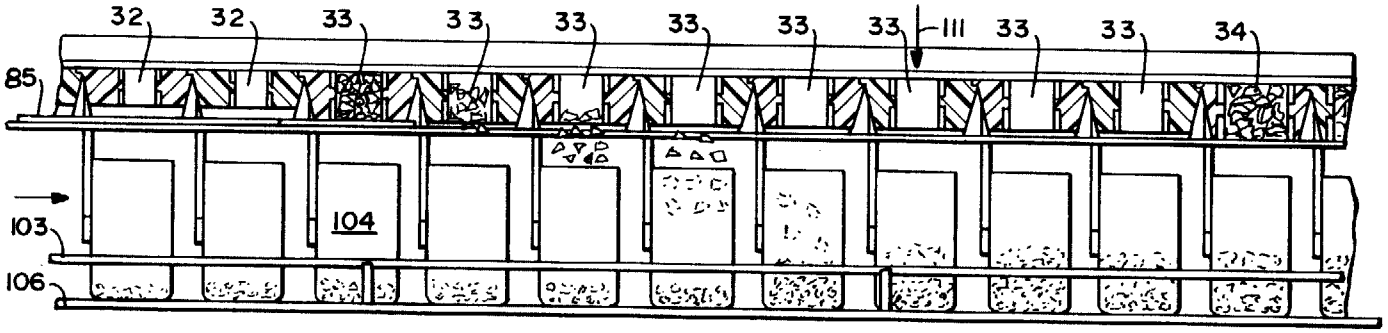
FIG. 7 is a detail partly in section illustrating discharge of fruit as the flights move through the filling region.
Figure 8:
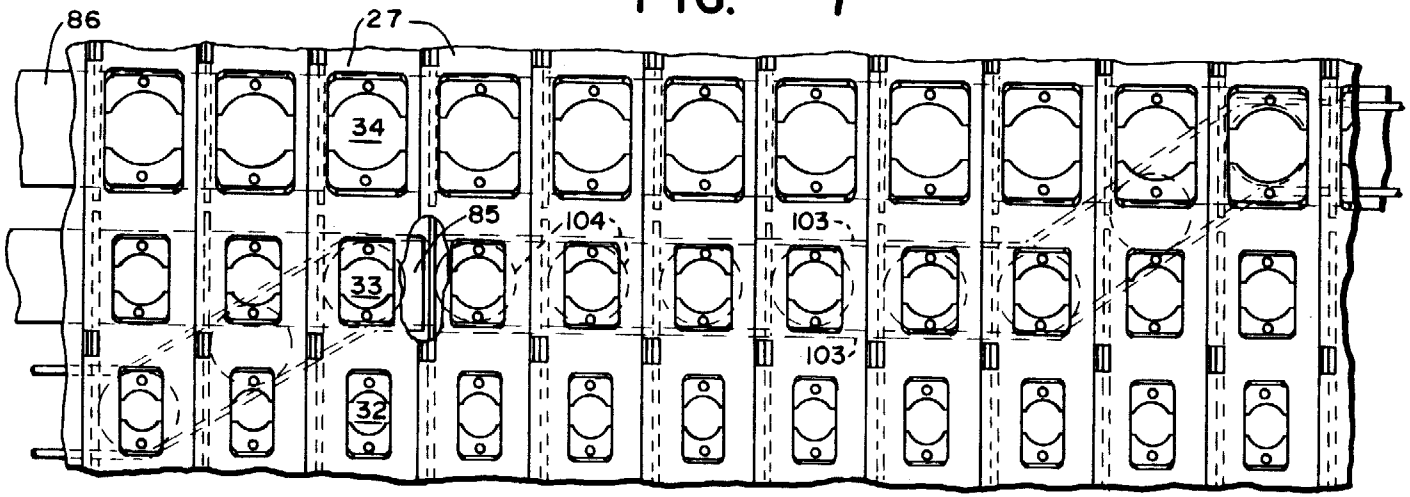
FIG. 8 is a plan view showing some of the flights, with the underlying guide means for the containers shown in dotted lines.

The sequence of operations described above is illustrated particularly in FIGS. 7 and 8. FIG. 7 illustrates a can underlying the flights in the process of shifting from a position below the pocket 32 of a flight to a pocket 33. Actually since this movement is synchronized with movement of the flights, the can is shifted from pocket 32 of a flight to a position below pocket 33 of the same flight. As shown in FIG. 7, strip 85 terminates to permit the contents of pocket 33 to fall into the underlying can or other container 104, and this discharge of the fruit, or dropout, occurs while the can is moving along a portion 107b of the guideway. Before the can is shifted below the next pocket, it may receive a blast of air which ensures discharge of any clinging pieces of fruit.

Figure 2:
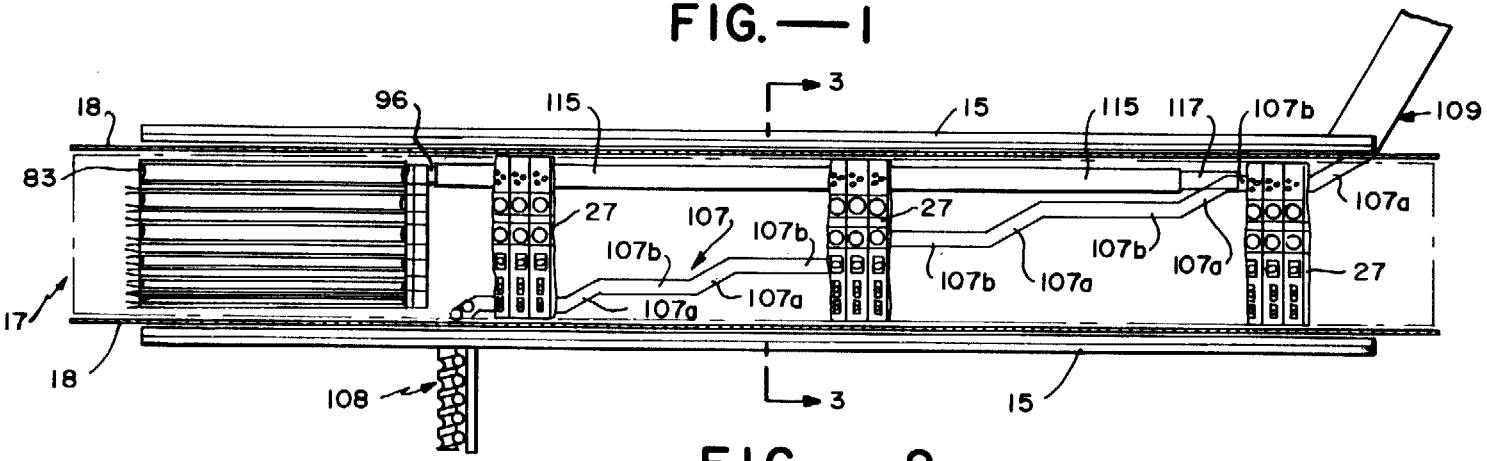
FIG. 2 is a plan view of a machine incorporating the present invention.
Figure 12:
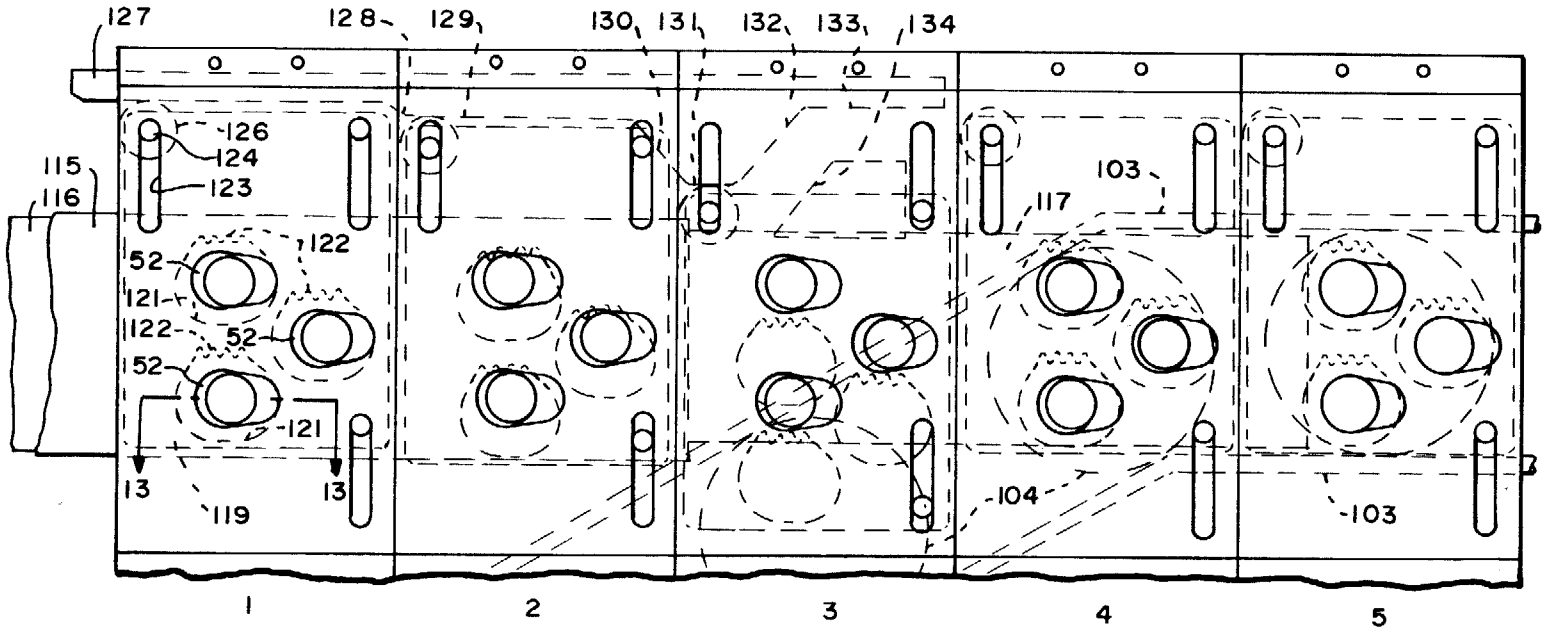
FIG. 12 is a plan view showing a portion of some of the flights, illustrating the means employed for slicing cherries.
Figure 13:
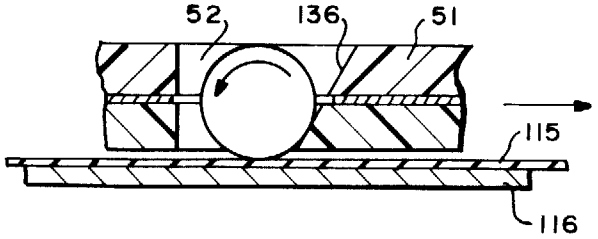
FIG. 13 is a detail in section showing a cherry being oriented before slicing.
Figure 14:
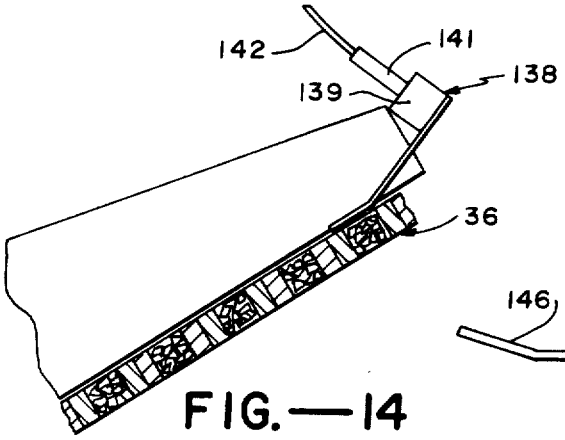
FIG. 14 is a schematic view illustrating the means employed for discharging streams of air across the measuring pockets of the flights.
Figure 15:
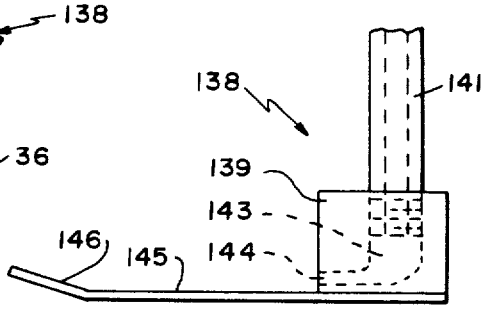
FIG. 15 is a side elevational detail on an enlarged scale showing one of the means employed for discharging air across the measuring pockets.
Figure 16:
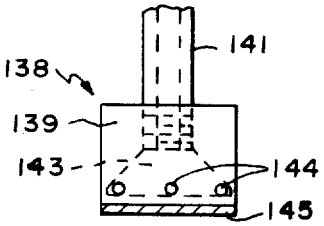
FIG. 16 is a view like FIG. 15 but looking toward the left hand end of the same.

The means employed for depositing cherry halves in the cans is constructed as follows. The strip 96 which underlies the portions 51 of the flights in zone A terminates in the adjacent portion of zone B (FIG. 2). Thereafter for effecting orientation of the cherries the flight portions 51 overlie the upper run of an endless belt 115. The upper run of this belt (FIG. 3) is retained by the underlying stationary supporting plate 116, whereby the upper surface of the belt is in close proximity with the lower surfaces of the flight portions 51 (FIG. 13). Near the discharge end of the machine the flight portions 51 move off of the belt and over a stationary underlying strip of plate 117 (FIG. 12). The end loops of the belt engage sheaves, one of which is driven at a desired speed by the motor driven chain 115a.

Suitable means is provided for slicing the cherries after their orientation. Thus the portions 51 of the flights may be recessed as indicated at 118 to accommodate the flat metal blades 119. These blades (FIG. 12) are provided with opening 121 which are somewhat larger in diameter than the openings 52. Also the blades are formed in such a manner as to provide serrated cutting edges 122. The flight portions 51 are each provided with guide slots 123 engaged by pins 124 that are carried by the blade. Pin 124 also carries the cam roller 126 which is adapated to cooperate with the profiled edge of the stationary cam strip 127. The profiling of this strip includes a portion 128 which when engaged by roller 126 serves to move the blade to the position shown in the number 2 position of FIG. 12. Thereafter there is a dwell period as the roller moves across the portion 129 of the strip. Further movement brings the roller in contact with the cam portion 130 which causes further movement of the blade to the position shown in the third position of FIG. 12, to effectively slice the cherries in the openings 52. After a short dwell during which the roller moves over cam portion 131, the roller is retracted along cam portion 132 until it is returned to its original position shown in the first position of FIG. 12. Roller 126 is engaged with a stationary cam member 134 in such a manner as to force its return.

FIGS. 12 and 13 show the endless belt 115 together with the underlying plate or strip 116 and the strip 117 which as previously explained terminates in the region where the cherry halves are deposited to the underlying can. The right hand position 5 in FIG. 12 shows termination of the strip 117 and is the discharge region. The initial partial movement of the blade shown in the position 2 of FIG. 12 serves to grip and retain the cherries in the openings 52 without however slicing completely through the same. Complete slicing is carried out as the flight moves into position 3. As movement occurs through position 3, the plate is retracted to its initial position, thus releasing the cherry halves to permit them to drop into the underlying container in position 5.

FIG. 13 illustrates a suitable configuration for each of the openings 52. The leading surface 136 for each of these openings is sloped and the cherry within the opening is shown resting upon the upper run of the belt 115. In practice the belt 115 is driven at a speed greater than the speed of the flights to provide a differential speed of the order of 40 to 50 feet per minute, with the result that as the flights move through the zone B, the cherries within the openings 52 are caused to spin about their stem axes and are urged against the leading surface 136, with the result that the cherries are oriented with the stem axis parallel to the belt 117 and extending at right angles to the direction of movement. This method of operation makes possible effective orientation with high speed movement of the flights. By the time the cherries have reached the end of the belt conveyer and proceed over the fixed strip 117, they are properly oriented, and therefore when the slicing operation takes place between the positions 2 and 3, the cherries are sliced in a horizontal plane which is substantially coincident with the same axis.

Previous reference has been made to the use of air jets adapted to project a stream of air downwardly into the pocket after the fruit has had an opportunity to discharge into the lower container. It is also desirable to use air jet means 138 at the entrant end of zone B to serve as a strike-off, or in other words, to remove any excess of the fruit which may be piled to a height on the flights above the upper flight surfaces. For this purpose a plurality of nozzle forming bodies or blocks 139, which may be made of suitable plastic material, are each connected to a pipe 141, which in turn is connected with a source of compressed air by tubing 142. Air ducts 143 are formed in each block which terminate in the air jet discharge openings 144. A deflector plate 145 is secured to each block 139 and is inclined downwardly toward the conveyer flights in zone A. The free end portion 146 of each plate 144 is bent to extend in a plane parallel and in close spaced relationship with the flights. When the machine is operating, air continuously jets over each plate 145, and because of the Bernelle effect, produces a flattened stream which sweeps over the upper plate surface. Each air stream is deflected by plate portion 146 to sweep across the corresponding measuring pockets as the flights progress toward the upper end of zone A. This serves effectively to strike off excess fruit on a plane coincident with the upper flight surface, without dislodging from the pocket, thus avoiding fluctuations in the fill weight.

Figure 17:
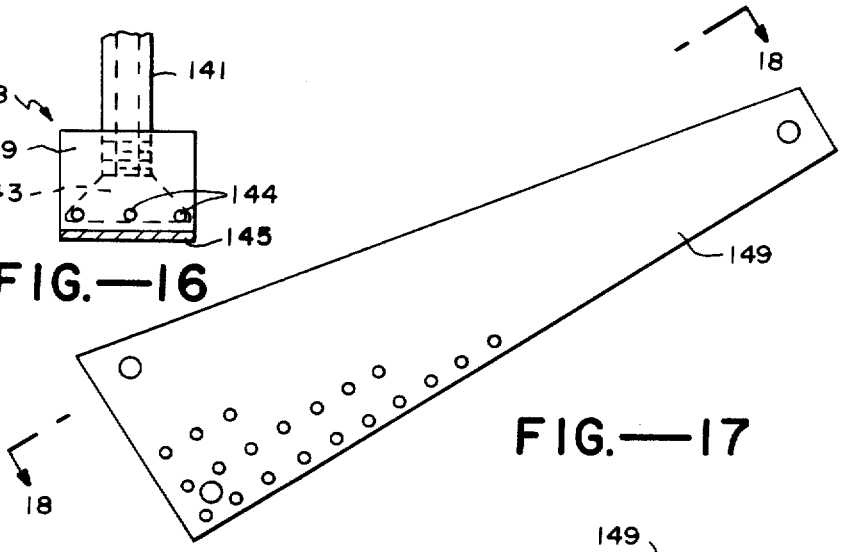
FIG. 17 is a schematic view illustrating one of the feed hoppers provided with means for introducing jets of air into the same.
Figure 18:
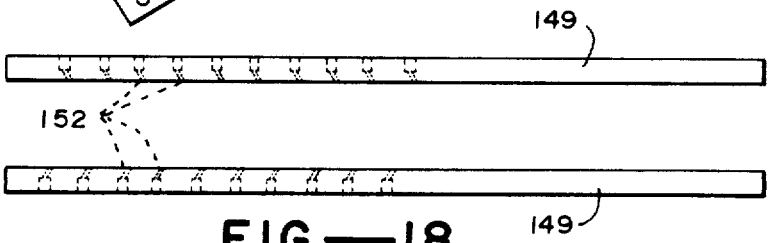
FIG. 18 is a plan view of FIG. 17 showing the air discharging ducts in the side walls of the hopper.
Figure 19:
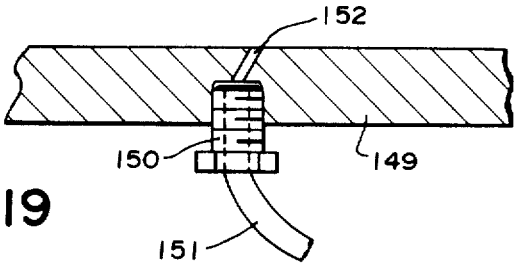
FIG. 19 is a detail illustrating one of the air discharging ducts shown in FIGS. 17 and 18 and the connection to the same.

It has been found that fruit like pieces of pineapple tend to hang up within the feed hopper, thus preventing proper feeding into the measuring pockets. To avoid this difficulty the hopper to which the fruit is supplied is provided with means which serves continuously to maintain the material in a fluffed condition. This is accomplished by continuously injecting air jets over the mass of material in zone A. FIGS. 17, 18 and 19 show a feed hopper having its side walls 149 provided with fittings 150 which are connected to a source of air pressure by tubes 151. Fittings 150 connect with ducts 152 formed in the side plates 149. The ducts are inclined toward the upper end of zone A and are coincident with planes generally parallel with the slope of zone A. Continuous jetting of air through ducts 152 into the fruit mass has a levitating and fluffing effect which prevents bridging or packing, with the result that the material properly progresses into the measuring pockets of the flights.

Figure 10:
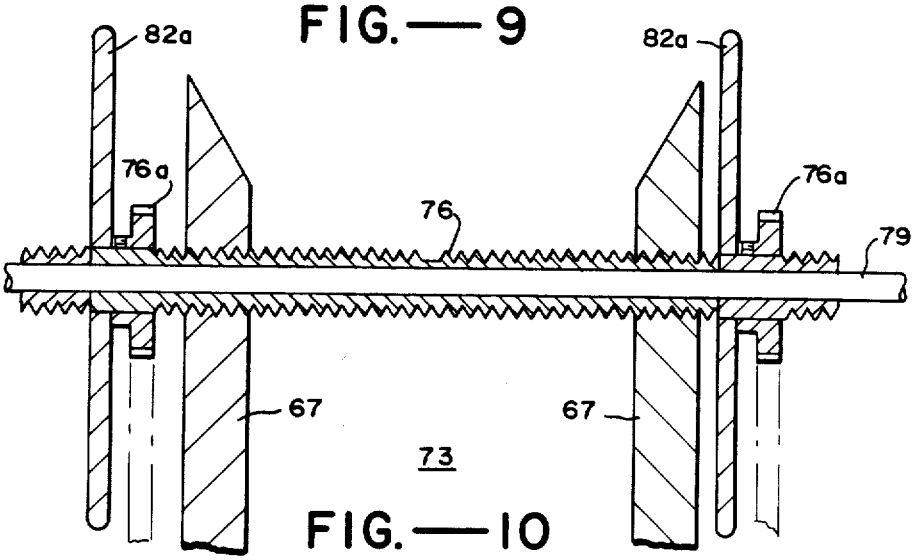
FIG. 10 is an enlarged detail showing the means for adjusting the feed hoppers.
Figure 11:
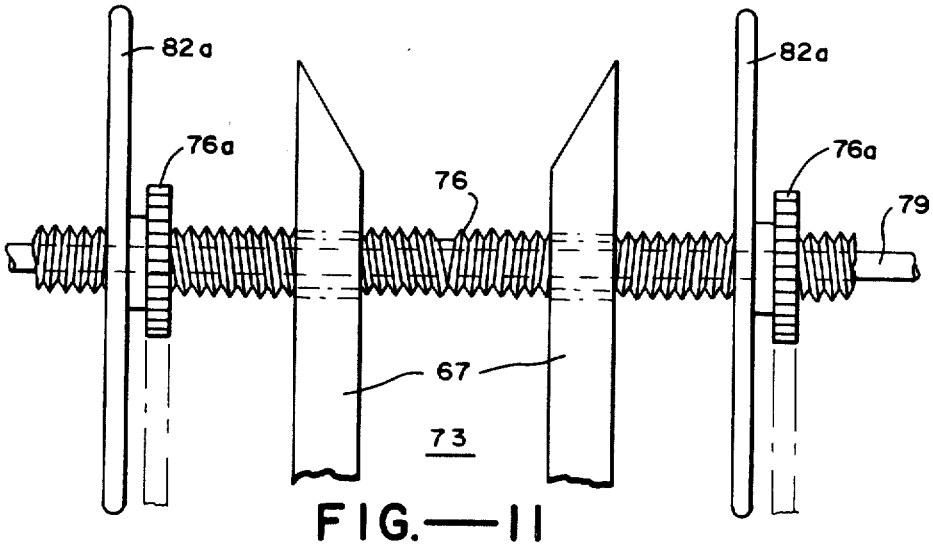
FIG. 11 is an enlarged detail like FIG. 10 but showing the side walls of that hopper in a different adjusted position.

General operation of the machine is as follows. The main conveyor is driven at a constant speed by suitable means (now shown) whereby the slats move through zones A and B at the speed desired. This speed may, for example, be of the order of 150 to 200 feet per minute. The hoppers 57, 71–74 are continuously supplied within the fruits which are desired in the cocktail mix. Depending upon the specification requirements, the hopper walls are individually adjusted by turning the disks 83, and this adjustment simultaneously determines the volume of each of the fruit receiving pockets. Processed cherries, such as those of the maraschino type, are likewise supplied to the hopper 75. Adjustment of the hoppers is illustrated in FIGS. 10 and 11. FIG. 10 shows the walls 56 for hopper 73 spread apart to provide a relatively large volume. In FIG. 11 the threaded tube 76 has been rotated to bring the walls 56 relatively close together, thus providing a hopper of minimum volume. As the slats progress through the upwardly inclined zone A, fruit from the hoppers is caused to fill the pockets and also cherries in the openings in the slat portions 51, and as the slats emerge from zone A, air jets are applied over the surfaces of the pockets to remove excess fruit. As the slats proceed through the zone B, cans or other containers are fed continuously into one side of the machine and they are successively presented beneath the first pocket 31 of each slat, immediately after which the lower end of the pocket is opened to permit the fruit to drop into the underlying can during the time the can is moving along the first portion 107b of the guideway. Before the can is moved to the next portion 107b, it is moved laterally beneath the second pocket 32. As the can proceeds through the second portion 107b of the guideway, the fruit from the open pocket 32 falls downwardly into the can on top of the first deposited fruit. This operation is continued until the can has reached the last guideway portion 107b toward the right hand end of the machine as shown in FIG. 2. Here the can is aligned with the portions 51 of the slats which carry the sliced cherry halves. Retraction of the cutting blade as the can enters this region permits the cherry halves to fall into the can. The can then proceeds out of the machine through the outgoing conveyer 109.

As peviously mentioned, there may be instances where a container is not below a measuring pocket during the interval the fruit is discharging. Instead of permitting such product to be discharged on the floor, it is desirable to provide a plurality of catch pans, with each pan being located below the region of discharge of a product. Such a pan 141 is shown in FIG. 3. Similar pans are indicated in FIG. 1 underlying each of the discharge regions. The upper portion of the pan is attached to the machine frame and its lower portion 142 is formed to retain fruit. Such recovered fruit can be recycled to the corresponding feed hopper.

*While the foregoing describes use of the invention for depositing various items of fruit into containers, it is also applicable to items other than fruit.*

What is claimed is:

1. In a [cocktail] *container* filling machine for introducing measured amounts of different kinds of [fruit] *items* into containers, conveyor means having a plurality of elongated parallel flight members extending laterally at right angles to the direction of conveyor movement, the movement of the flights being through [a fruit] *an item* receiving zone and then through a container filling zone, each flight having means forming a single row of spaced pockets disposed along the length of the same, each pocket being formed to receive a measured amount of one kind of [fruit] *item*, feed means in the [fruit] *item* receiving zone for separately introducing one kind of the different [fruits] *items* into each pocket to fill the same, container guide means underlying the flights in the filling zone for guiding containers along a zigzag path below the flights, container pusher means extending parallel to each flight and moving with the same to move the open containers through the filling zone in the guide means below a flight and at the same speed as the flight, *along* the zigzag path of the guide means to successively present the container along the length of the flight beneath each of the pockets of the flight while the flight is progressed through the filling zone, and closure means for closing the lower sides of the pockets, said closure means terminating the closing of the pocket when a container is below a pocket in the filling zone to allow the filling of said container.

2. A machine as in claim 1 in which the pockets of the flights are each adjustable as to volume, and means for adjusting each of the pockets to a predetermined volume as they progess through the [fruit] *item* receiving zone.

3. A machine as in claim 1 in which opposed side walls of the pockets of the flights are formed by members slidably carried by the flights for movement in the direction of the length of the flights, whereby movement of said members toward and away from each other serves to vary the volumetric capacity of the pocket.

4. A machine as in claim 1 in which the means in the [fruit] *item* receiving zone comprises a plurality of feed hoppers overlying the filling zone, each of said hoppers serving to feed a particular kind of [fruit] *item* into a corresponding pocket of the flights.

5. A machine as in claim 4 in which the hoppers are adjustable to vary the volume of the same.

6. A machine as in claim 5 in which means serves to adjust the volume of the pockets in conjunction with adjustment of the hoppers.

7. A machine as in claim 1 in which means is disposed below each region where a container is normally presented below a measuring pocket for receiving [fruit] *items* that [is] *are* not received by a container.

8. [A machine as in claim 1 together with ] *In a cocktail filling machine for introducing measured amounts of different kinds of fruit into containers, conveyor means having a plurality of elongated parallel flight members extending laterally at right angles to the direction of conveyor movement, the movement of the flights being through a fruit receiving zone and then through a container filling zone, each flight having means forming a single row of spaced pockets disposed along the length of the same, each pocket being formed to receive a measured amount of one kind of fruit, feed means in the fruit receiving zone for separately introducing one kind of the different fruits into each pocket to fill the same, container guide means underlying the flights in the filling zone for guiding containers along a zigzag path below the flights, container pusher means extending parallel to each flight and moving with the same to move the open containers through the filling zone in the guide means below a flight and at the same speed as the flight, along the zigzag path of the guide means to successively present the container along the length of the flight beneath each of the pockets of the flight while the flight is progressed through the filling zone, closure means for closing the lower sides of the pockets, said closure means terminating the closing of the pocket when a container is below a pocket in the filling zone to allow the filling of said container, and* means for orienting, slicing and depositing cherry slices into the containers, said means including cherry accommodating holes formed in an end portion of each flight and cutting means for slicing cherries within the holes.

9. A machine as in claim 8 in which the orienting means comprises a belt underlying the flight and closing the lower ends of the holes, and means for driving the belt in the same direction as movement of the flight and at a speed substantially greater than the speed of movement of the flight, thereby causing spinning of the cherries within the holes with the cherries being urged against the leading surfaces of the holes.

10. A machine as in claim 8 in which the cutting means consists of cutting blades, the blade serving to slice cherries within the holes into halves during movement of the associated flight through the container filling zone.

11. A machine as in claim 1 in which means is disposed adjacent the end of the [fruit] *item* receiving zone for discharging streams of fluid across the upper flight surfaces and the measuring pockets before the flights progress out of the receiving zone and into the filling zone, whereby excess [fruit is] *items are* removed and returned to the feed means.

12. A machine as in claim 11 in which said last named means consists of means forming air jet discharging ducts connected to a source of compressed air and disposed to discharge in a direction opposite to the direction of movement of the flights, and deflector plate means interposed between the path of the jets and the upper surfaces of the flights.

13. A machine as in claim 4 in which at least one of the feed hoppers is provided with means for introducing jets of air into the same to fluff the mass of [fruit] *items* within the same.

14. A method for filling containers with a plurality of different kinds of [fruit] *items* comprising the steps of continuously progressing elongated conveyor flights through [fruit] *item* receiving and container filling zones, the flights each extending laterally at right angles to the direction of conveyor movement and each flight having a single row of measuring pockets disposed along the length of the flight, filling the measuring pockets of each flight with [fruit] *items* in the [fruit] *item* receiving zone, with one kind of [fruit] *item* in each pocket and while the lower end of each pocket is closed, progressing the containers to be filled with the different [fruits] *items* through the container filling zone by moving the container at the same speed as the flight and in a zig-zag path of movement being such that a container is successively shifted along the length of the flight to positions below each of the pockets of a flight as it progresses through the filling zone and dwells in each such position to receive [fruit] *items* from the associated pocket, and opening the lower end of each pocket while a container is positioned below the same to drop the [fruit] *items* therein into the container, the lower end of each pocket of a flight being opened successively thereby delivering measured amounts of the different kinds of [fruit] *items* into the container for each such position.

15. A method as in claim 14 in which the volume of each of the pockets is adjusted to a predetermined value as the pockets are moved through the [fruit] *item* receiving zone.

16. A method as in claim 14 in which a downwardly directed stream of air is applied to each pocket while the pocket is open and during the interval that a container is disposed below the same.

17. A method as in claim 14 in which as the fights and the pockets formed in the same progress out of the [fruit] *item* receiving zone they are subjected to fluid jets directed across the upper surfaces of the flights to remove excess [fruit] *items* from the pockets.

18. A method as in claim 14 in which the pockets are caused to be filled as they progress below hoppers to which the [fruit is] *items are* supplied and the mass of material in at least one of the hoppers if fluffed by injecting jets of air into the same.

* * * * *